April 1, 1958      E. N. OGLE      2,828,685
TOAST WARMER AND CRISPER
Filed Oct. 5, 1953
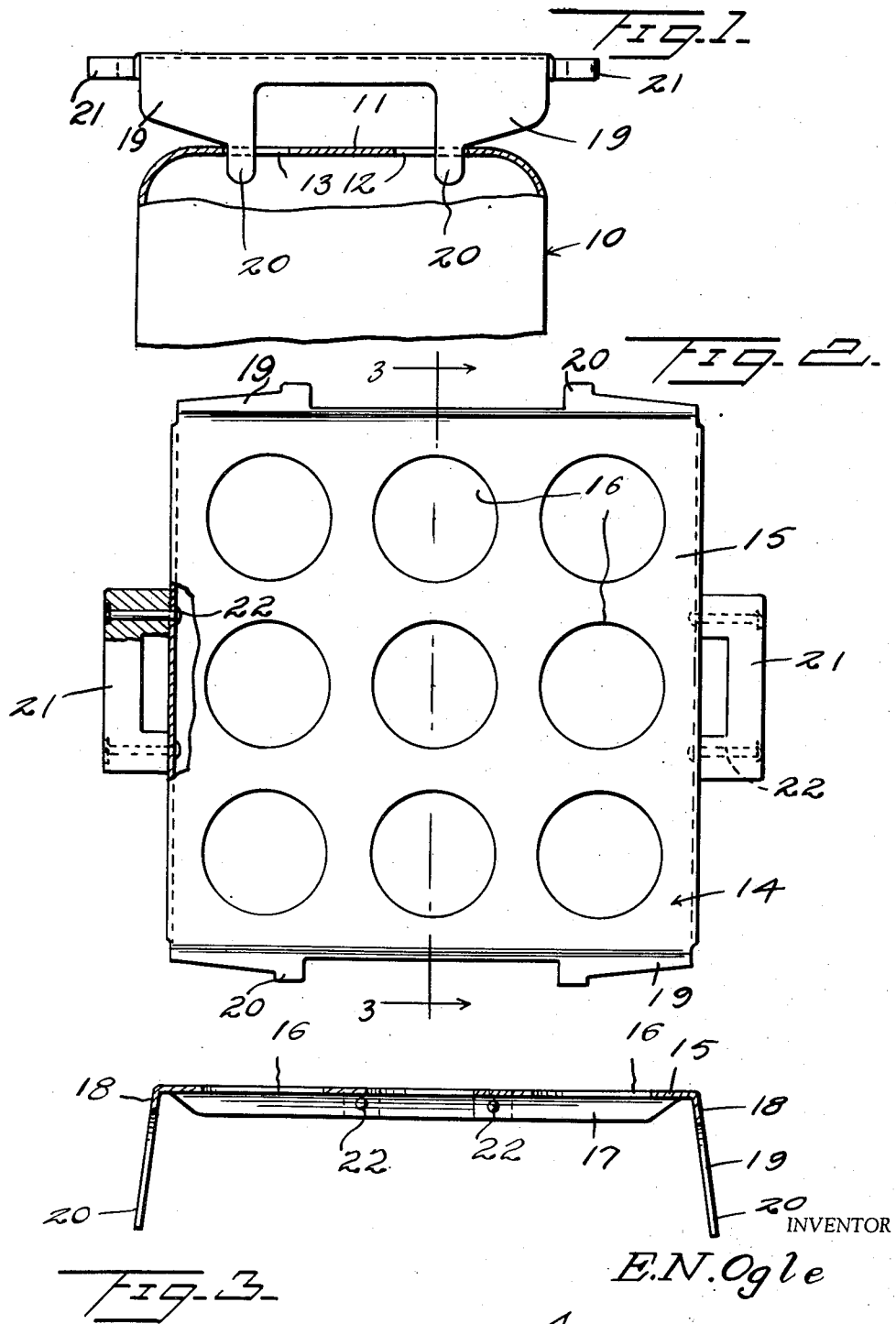
INVENTOR
E. N. Ogle
BY Kimmel & Crowell
ATTORNEYS United States Patent Office 2,828,685
Patented Apr. 1, 1958

2,828,685

TOAST WARMER AND CRISPER

Earl N. Ogle, Bozeman, Mont.

Application October 5, 1953, Serial No. 384,058

1 Claim. (Cl. 99—339)

This invention relates to a means for keeping toast warm.

An object of this invention is to provide a device adapted for mounting on top of a toaster for keeping toasted bread slices warm and crisp.

Another object of this invention is to provide a toast warming means which will permit the normal use of the toaster for toasting a pair of bread slices while simultaneously keeping previously toasted slices warm.

A further object of this invention is to provide a device of this kind which is simple in construction and can be used with various types of twin or double slice toasters of the automatic or pop-up type.

These and ancillary objects and structural features of merit are attained by this invention, the preferred embodiment of which is set forth in the following description and illustrated in the accompanying drawing.

In the drawing:

Figure 1 is a detailed end elevation, partly broken away and in section of a toast warming and crisping device constructed according to an embodiment of this invention.

Figure 2 is a plan view, partly broken away, and in section of the device.

Figure 3 is a sectional view taken on the line 3—3 of Figure 2.

Referring to the drawing, the numeral 10 designates generally, an automatic toaster which is of the twin or double slice toaster type and is provided with a top wall 11 having a pair of elongated openings 12 and 13 through which the bread slices are inserted and removed from the toaster.

In order to provide a means whereby previously toasted slices of bread may be kept warm and crisp and additional slices may also be toasted, I have provided a holder, generally indicated at 14. The holder 14 is formed of a relatively thin plate 15, which is formed with a plurality of openings 16. The plate 15 is provided with side flanges 17 and end flanges 18. The end flanges 18 are disposed in downwardly divergent relation so that a series of these holders may be nested together.

The flanges 18 are formed with downwardly extending pairs of wings 19 and a narrow lug or finger 20 projects downwardly from each wing 19 and is adapted to engage in an opening 12 or 13 in the top of the toaster 10. The wings 19 provide a means for holding the device in upwardly offset position, with respect to the top of the holder, so that the heat rising through the openings 12 and 13 of the toaster 10 will spread evenly about the bottom of the plate 15 for heating this plate, and the heat will also rise upwardly through the openings 16 for contacting with the toast resting on the top of the plate 15.

The side flanges 17 have secured thereto, a pair of U-shaped handles 21, which are secured to the flanges 17 by means of rivets or fastening elements 22. Preferably, these handles 21 are formed of composition material and as the handles project laterally, they will not become unduly heated, so that the holder may be lifted from the top of the toaster to permit the insertion of additional slices of bread.

The holder 14 is adapted to be stamped out of sheet metal such as aluminum or the like and the holder will readily absorb heat through the area thereof, with heat freely passing through the relatively large opening 16.

In the use and operation of this device, after one or more slices of bread have been toasted in the toaster 10, which is preferably an automatic toaster of the pop-up type, the toasted slices may be placed on the upper side of plate 15 and additional slices placed in the toaster 10 through the openings 12 and 13. The heat generated in the toaster 10 will rise upwardly through the openings 16 for contact with the bread slices resting on plate 15. Plate 15 will be heated throughout the area thereof so that the slice or slices of toast resting on the holder 14 will be maintained warm as additional bread slices are being toasted.

If no additional slices are to be toasted, the toaster 10 may be operated in the normal manner to heat the heating coils thereof in order that the heat from the coils will rise upwardly to keep the previously toasted slices warm and crisp.

What is claimed is:

A toast warmer and crisper for a double slice toaster of the type having toast passage openings in the upper wall thereof comprising a unitary blank stamped from sheet metal to form a substantially rectangular plate having a plurality of spaced aligned and substantially circular openings formed therein and extending therethrough, said plate having a pair of oppositely disposed side flanges depending therefrom at an angle thereto, each of said flanges having a handle secured thereto and projecting laterally therefrom, a laterally extending and divergent flange depending from the opposite side edges of said plate between said side flanges, each of said divergent flanges having a centrally located recess extending inwardly from their respective longitudinal sides, each of said divergent flanges having a notch extending inwardly from their respective opposite ends to delineate wing and lug members, said wing members seating on the upper wall of the toaster, and said lugs slidably engaging the remote sides of the toaster openings.

References Cited in the file of this patent

UNITED STATES PATENTS

| 389,602 | Sankey | Sept. 18, 1888 |
| 2,290,658 | Volks | July 21, 1942 |
| 2,493,222 | Braucht | Jan. 3, 1950 |
| 2,521,855 | Kodadek et al. | Sept. 12, 1950 |
| 2,565,046 | Rooth | Aug. 21, 1951 |
| 2,659,295 | Soccoli | Nov. 17, 1953 |

FOREIGN PATENTS

| 132,064 | Australia | Apr. 4, 1949 |